United States Patent [19]

Keedy

[11] Patent Number: 4,579,318
[45] Date of Patent: Apr. 1, 1986

[54] SHIELD FOR CUTTING TORCH TIP
[75] Inventor: Edgar L. Keedy, Liberty Center, Ohio
[73] Assignee: V-K Enterprises, Inc., Detroit, Mich.
[21] Appl. No.: 742,929
[22] Filed: Jun. 10, 1985
[51] Int. Cl.⁴ .............................................. B23K 7/10
[52] U.S. Cl. ...................................... 266/66; 266/76
[58] Field of Search .......................... 266/66, 48, 76

[56] References Cited
U.S. PATENT DOCUMENTS

| | | |
|---|---|---|
| 602,835 | 4/1889 | Dolan . |
| 857,247 | 6/1907 | Menne . |
| 1,142,355 | 6/1915 | Mueller . |
| 1,474,957 | 11/1923 | Dorsey ................................. 266/66 |
| 1,556,880 | 10/1925 | Royer . |
| 1,731,020 | 10/1929 | Messer . |
| 1,872,619 | 8/1932 | Coberly . |
| 2,486,575 | 11/1949 | Rooke ................................. 266/66 |
| 2,600,709 | 6/1952 | Varley . |
| 3,390,838 | 7/1968 | Stalberger . |
| 3,558,062 | 1/1971 | See . |
| 3,604,632 | 9/1971 | Elchelman . |
| 3,736,957 | 6/1973 | Gutermann et al. . |
| 4,176,829 | 12/1979 | Dixon ................................. 266/66 |
| 4,273,313 | 6/1981 | DeNardo ............................. 266/76 |
| 4,511,086 | 8/1985 | Kuo . |

Primary Examiner—Wayland Stallard
Attorney, Agent, or Firm—Harness, Dickey & Pierce

[57] ABSTRACT

A shield for a torch tip for a hand held cutting torch with the shield being generally tubular and adapted to receive the tip in clearance relationship and being adjustable both axially and radially relative to the tip to selectively determine the radial spacing between the tip and shield, and the height that the shield holds the tip from a workpiece whereby the tip will be substantially precluded from engaging the heated workpiece surface.

12 Claims, 7 Drawing Figures

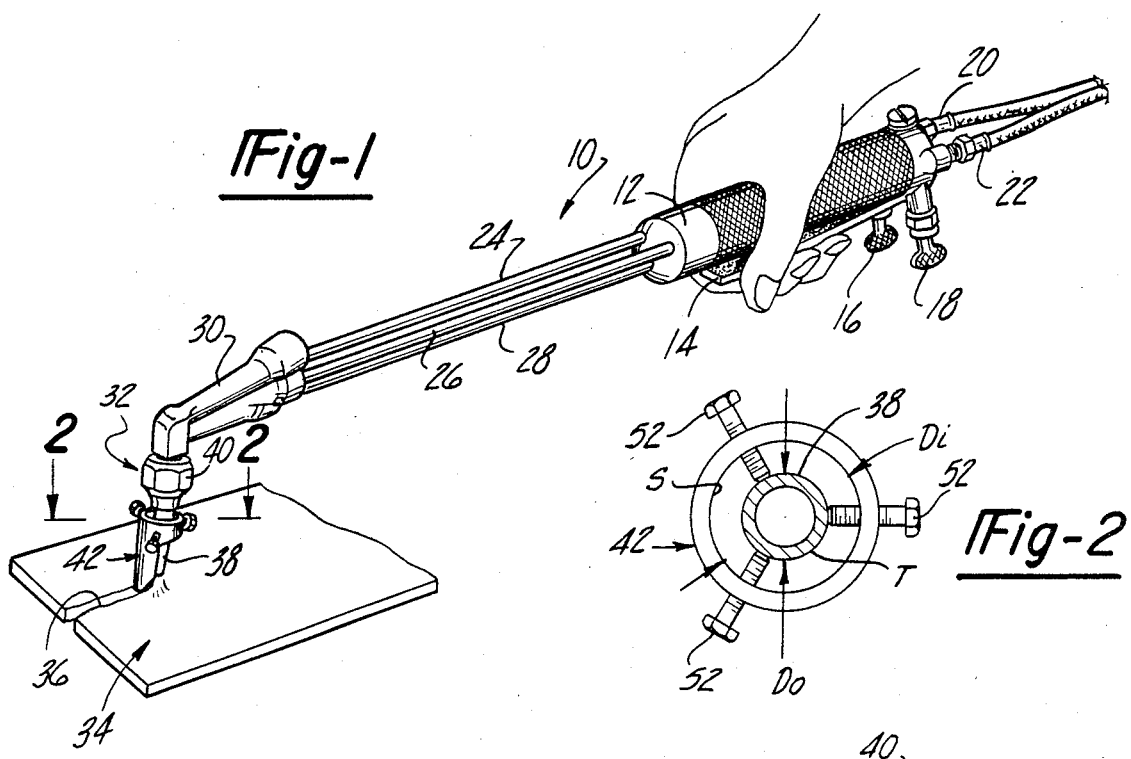

SHIELD FOR CUTTING TORCH TIP

SUMMARY

Background Of The Invention

The present invention relates to a cutting torch tip and shield therefor and more particularly to a cutting torch tip and shield for use with a hand held cutting torch.

In utilizing a hand held torch for cutting metal workpieces the tip of the torch is located by the operator a selected distance from the workpiece. Occasionally in the cutting operation the tip will engage the heated metal proximate the kerf or cutting line. The result can be damage to the torch tip requiring its replacement. In addition the operator's production will be interrupted by the time required to change tips.

In the present invention a removable, adjustable shield has been provided which is operative with the torch tip to protect the tip while still permitting the operator to have flexibility in the manipulation of the torch. The shield can be made of a high heat resistant material and in the present invention is selectively adjustable to permit the distance of the torch tip to the workpiece to be set at a desired height.

The radial spacing of the shield from the tip can also be adjusted such that a venturi effect can be provided to increase the air flow across the shield to facilitate cooling. In one form of the invention the end surface of the guide is notched so that it can straddle opposite sides of the kerf to minimize the amount of slag or debris that might be picked up as the shield is dragged across the workpiece.

Thus it is an object of the present invention to provide a unique shield construction for use with a cutting torch tip.

It is another object to provide such a shield which is readily removable and which is easily adjustable for selecting the desired height of the torch tip from the workpiece.

It is still another object to provide such a shield in which the radial spacing of the shield from the torch tip can be adjusted to provide a desired venturi effect for cooling the shield.

Other objects, features and advantages of the present invention will become apparent from the subsequent description and the appended claims, taken in conjunction with the accompanying drawings, in which:

FIG. 1 is a pictorial view depicting a hand held cutting torch and a cutting tip with a shield, embodying features of the present invention;

FIG. 2 is a sectional view, to enlarged scale, of the cutting tip and shield taken generally in the direction of the arrows 2—2 in FIG. 1;

FIG. 3 is a fragmentary side elevational view to enlarged scale, of the cutting tip and shield of FIG. 1;

FIG. 4 is a front elevational view of the shield of FIG. 1;

FIG. 5 is a fragmentary pictorial view of the torch tip and shield depicting a groove in the shield straddling the kerf or cutting line of a workpiece;

FIG. 6 is a front elevational view of a different form of shield; and

FIG. 7 is a side elevational view, partially broken away of the shield of FIG. 6.

Looking now to FIG. 1 a hand held cutting torch 10 is shown and includes a handle and valve body 12, a manual operating valve 14 and a pair of control valves 16 and 18. One flexible line 20 is adapted to connect the control valve 16 to a source of oxygen while another flexible line 22 is adapted to connect the control valve 18 to a source of a gas fuel such as acetylene. Three tubes 24, 26 and 28 communicate the oxygen and fuel from the valve body 12 to a cutting head 30 where the oxygen and fuel are finally mixed and transmitted out from a torch tip assembly 32 and ignited for cutting a workpiece 34 along a cutting line or kerf 36.

Conventionally two of the tubes 24, 26 and 28 are connected to the oxygen control valve 16 while the other is connected to the gas fuel valve 18. The operating valve 14 is an on-off type valve which is connected to one of the oxygen carrying tubes to provide the extra oxygen for cutting. However, the details of the cutting torch 10, except for the tip assembly 32, do not constitute a part of the present invention and hence these details have been omitted. Thus it should be understood that the present invention can be utilized with hand held torches of different constructions.

The tip assembly 32 includes a torch tip 38 which is removably secured to the cutting head 30 via a threaded fitting 40. A shield 42 is removably secured to the torch tip 38.

The shield 42 is of a generally tubular construction having an inside diameter Di which is between around 1.5 to around 3 times the outside diameter Do of the torch tip 38. In this regard it is noted that the outside diameter Do changes over the length of the torch tip 38 by virtue of a slight taper in its outer surface T.

The shield 42 has an annular support ring portion 44 and a truncated or cut away portion 46 which terminates at its lower end with a workpiece engaging end portion 48 which is generally arcuate. A notch 50 is provided at the extremity of the end portion 48 for a purpose to be described. The front to back truncation of shield 42 permits the operator to view the torch tip 38 relative to a desired cutting line.

The shield 42 is clamped to the torch tip 38 via three generally equally, circumferentially spaced set screws 52 located in threaded bores 54 in the support ring portion 44. The shield 42 is selectively located longitudinally along the torch tip 38 such as to space the end of the torch tip 38 a selected distance H from the extremity of the shield end portion 48 and hence generally determines the distance of the torch tip 38 from the workpiece 34.

The distance d between the shield inner surface S at its front end and the torch tip outer surface T can be selectively varied by manipulation of the screws 52. In this manner a venturi effect can be provided by selecting the desired spacing whereby cooling air will be drawn down and across the inside surface S at the front end of the sleeve 42.

Even though the shield 42 is constructed of a high temperature resistant material the cooling air will tend to protect the shield from excessive temperatures. In fact with such a cooling structure the materials used need not be excessively heat resistant and hence less expensive materials can be used.

As shown in FIGS. 1 and 5, the cutting torch 10 is being moved across the workpiece 34 in the direction X. In this mode of operation the shield 42 will be moved over the kerf 36. In order to inhibit the shield 42 from accumulating slag and other debris as it is dragged across the workpiece 34, the notch 50 is provided to be of a sufficient width to straddle opposite sides of the kerf 36. This spacing also assists in locating the workpiece engaging sections as separated by the notch 50 at least a slight distance away from the area of highest temperature adjacent the kerf 36.

Note that the end surface 48 is arcuately shaped. This permits the operator to tilt the torch 10 and torch tip 38 to facilitate cutting in certain condition. While the shield 42 is shown located with the end portion 48 at the front of the torch tip 38, it can be readily located with the end portion 48 to one side of the torch 10 to suit the operator's needs.

FIGS. 6 and 7 depict a modified form of shield in which components similar to like components in the embodiment of FIGS. 1-5 have been given the same numeral designation with the addition of the letter "a".

Thus in FIGS. 6 and 7 the shield 42a is formed from tubing to define the truncated or cut away portion 46a substantially by a single line. This facilitates the construction of duplicate shields 42a from tube stock by generally only one cutting operation. The end portion 48a again will be arcuately shaped to facilitate tilting by the operator. While no notch, such as notch 50, is shown, the shield 42a can be formed with such a notch for straddling the cut line.

In one form of the invention the angle A of truncation was 45°; however, other angles between around 30° to around 60° could be utilized although an included angle for at least a part of the truncation of around 30° to around 45° is preferred. Note again, that the truncation, facilitates viewing of the cutline by the operator.

Thus a unique shield has been provided which protects the torch tip of a cutting torch while still facilitating manipulation of the torch by the operator.

While it will be apparent that the preferred embodiments of the invention disclosed are well calculated to fulfill the objects above state, it will be appreciated that the invention is susceptible to modification, variation and change without departing from the proper scope or fair meaning of the invention.

I claim:

1. In a hand held cutting torch having a removable tubular cutting tip for cutting a workpiece along a cut line the invention comprising:
   a shield having a generally tubular construction with a through bore,
   said shield adapted to be located over the cutting tip, fastener means for securing said shield to the cutting torch with said through bore defining a preselected radial clearance with the cutting tip at the forward end of said shield,
   said shield having a lower end portion at said forward end for engaging the workpiece and being truncated rearwardly from said lower end portion to facilitate viewing of the cut line by the operator.

2. The invention of claim 1 with said shield having a notch at said lower end portion of sufficient width for straddling the kerf formed on the cut line by the torch.

3. The invention of claim 1 with said lower end portion of said shield being arcuately formed to facilitate tilting of the cutting torch by the operator.

4. The invention of claim 1 with said through bore having a diameter of around between 1.5 to around 3 times the outside diameter of the cutting tip.

5. The invention of claim 1 with said preselected radial clearance providing a venturi effect for drawing cooling air across the inside surface of said shield at said forward end.

6. The invention of claim 1 with said shield being truncated at least partially along a line defining an included angle of between around 30° to around 45°.

7. The invention of claim 1 into said shield being truncated at least partially along a line defining an included angle of between around 30° to around 60°.

8. In a hand held cutting torch having a removable tubular cutting tip for cutting a workpiece along a cut line the invention comprising:
   a shield having a generally tubular construction with a through bore,
   said shield adapted to be located over the cutting tip, fastener means for securing said shield to the cutting torch with said through bore defining a preselected radial clearance with the cutting tip at the forward end of said shield,
   said shield having a lower end portion at said forward end for engaging the workpiece and being truncated rearwardly from said lower end portion to facilitate viewing of the cut line by the operator,
   said shield having a notch at said lower end portion of sufficient width for straddling the kerf formed on the cut line by the torch,
   said lower end portion of said shield being arcuately formed to facilitate tilting of the cutting torch by the operator.

9. The invention of claim 8 with said through bore having a diameter of around between 1.5 to around 3 times the outside diameter of the cutting tip.

10. The invention of claim 8 with said preselected radial clearance providing a venturi effect for drawing cooling air across the inside surface of said shield at said forward end.

11. The invention of claim 8 with said shield being truncated at least partially along a line defining an included angle of between around 30° to around 45°.

12. The invention of claim 8 into said shield being truncated at least partially along a line defining an included angle of between around 30° to around 60°.

* * * * *